Nov. 13, 1945.   T. W. FEENEY   2,389,035
BACK LASH TAKE-UP
Filed July 6, 1942
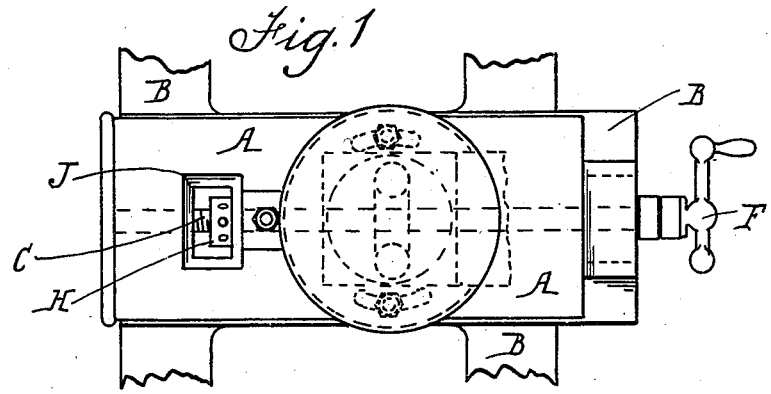
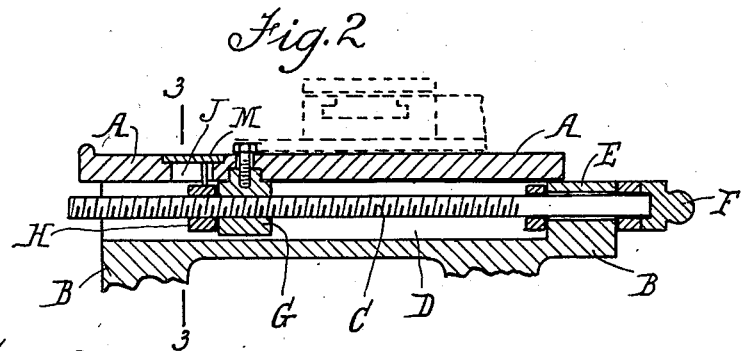
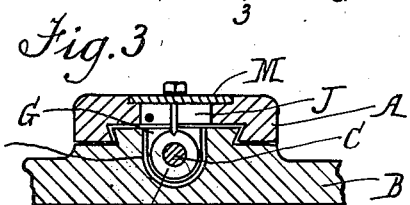
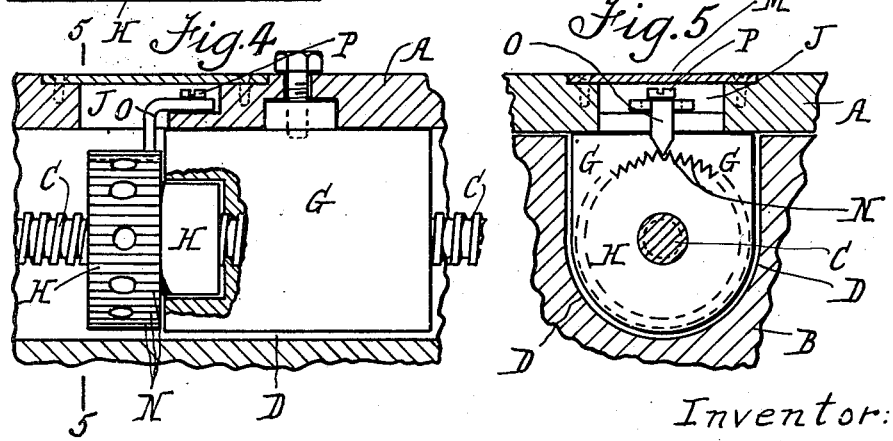
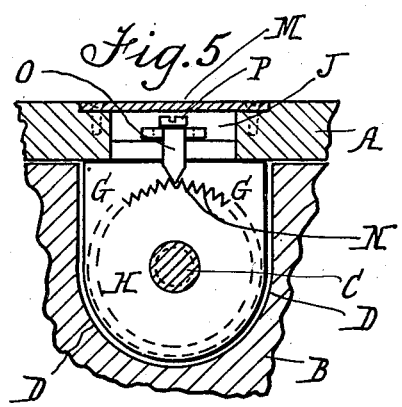
Inventor:
T. W. Feeney
By Young, Emery & Thompson
Attorneys Patented Nov. 13, 1945

2,389,035

UNITED STATES PATENT OFFICE 2,389,035

BACKLASH TAKE-UP

Terence Wordsworth Feeney, Wellington, New Zealand

Application July 6, 1942, Serial No. 449,924

1 Claim. (Cl. 74—441)

This invention relates to lathes and like machines in which the make up of the machine provides for a tool post and rest carrying slide being actuated by a screw spindle to move it longitudinally to and fro across its saddle support, in the adjustment of the tool to the work being performed in the machine.

It is common in respect to the use of such machines for wear to take place as concerned with the thread of the said screw and of the nut block fixed to the slide, in which the screw turns. This wear results in a certain amount of slackness which renders it difficult to adjust and to maintain the tool carrier by the slide, accurately in position in relation to the work being performed. In the performance of high precision work therefore this liability of the slackness to develop is a serious drawback. The only remedy hitherto has been to renew the worn parts, which means the withdrawal of the machine from operation.

The present invention has been devised with the object of providing for a simple addition being made to the machine's construction, by the use of which any looseness developing in the nut block, and, or screw, may be compensated for and the slide kept firmly locked to the screw. The means provided for this purpose are of such a nature that they may be combined in the machine without any variations in its general manner of construction and may be operated from time to time, as need arises, without trouble and in a minimum period.

The invention comprises for the said purpose, the combination with the said screw, and with the said nut block, of a black nut screwing upon the screw against the end face of the nut block and which by being tightened against such face will cause the thread of the screw to be closely gripped between itself and the thread in the nut block and thus take up any longitudinal looseness. As looseness develops by wear, it may be taken up by an adjustment of the nut. The said back nut is, when adjusted, held from rotation on the screw by being suitably locked to the slide so that it forms one with the slide assembly in the to and fro movements of such slide brought about by the turning of the screw.

In the details of the application of this invention to any particular machine, or to any particular construction of a class of machine, a number of variations may be made to suit the circumstances thereof. In more fully describing its form and manner of application it is in this specification described as being used in respect of a lathe of the common type and in respect of characteristics of construction which are common to a number of other machine tools, as milling machines, shaping machines, drilling machines, and so on.

This adaptation of the invention to a lathe is illustrated in the accompanying drawing and will be hereinafter described in relation thereto. In such drawing—

Fig. 1 is a plan of the slide mounted on its saddle and showing the means for operating it.

Fig. 2 is a longitudinal sectional elevation thereof.

Fig. 3 is a cross sectional elevation taken on the line 3—3 of Fig. 2 and looking to the right of such line.

Fig. 4 is an enlarged side elevation illustrating the details of the invention according to a suitable manner of giving effect thereto.

Fig. 5 is a cross sectional elevation taken on the line 5—5 of Fig. 4 and looking to the right of such line.

A is the slide having the usual tool post fittings mounted thereon and indicated by dotted lines in Figs. 1 and 2. B is the saddle on which the slide is mounted to move longitudinally to and fro in a line transversely with the saddle in order to adjust the tool post in the required relationship with the job in the lathe. C is the operating screw for moving the slide A, such screw being disposed to extend longitudinally in a tunnel D formed in the saddle and being mounted to rotate in a journal bearing E at the outer end of such tunnel in a manner to prevent any longitudinal movement of the screw. F is the handle upon its outer end, for thus rotating it.

G is the block nut secured to the undersurface of the slide A to depend into the said tunnel D and through which the screw C screws in order that by the turning of the screw, the slide A may be moved in, or out, upon the saddle.

These are common features of construction in respect of lathes and a number of machines of like nature and may vary in details of form and disposition of the parts in different machines but retaining the same characteristic feature of the tool carrying slide being adjusted to the working positions of the tool by the rotation of the screw C within the nut block G.

In the use of this mechanism, there is a common tendency of the thread in the nut block G, and in some instances also the thread of the screw C, to become worn, thereby developing a looseness or backlash that serves to interfere with the maintenance of the slide in its desired working position. It is to overcome the effect of this tendency that the improvements forming this invention have been devised.

The improvements comprise the employment of a back nut H upon the screw to act as a back nut to the nut block G by engaging the end face of such block, the construction of the machine so as to permit of the said back nut being adjusted in its tension upon the nut block from time to time as required; and the provision of suitable means for locking the nut H from rotation when it has been adjusted.

The details of construction of these features may be varied in a large number of ways without departing from the general features of the invention, in order to meet the nature of the machine to which the invention is applied and the general circumstances of its use.

It will readily be understood that with the back nut H turned on the screw C to cause the nut to engage the end face of the nut block G, the screw thread will be caused to bind upon the sides of the threads of the nut block and of the back nut so that any slackness in the longitudinal line of the screw is taken up or prevented. Then with the back nut locked to the slide A in a manner to prevent any rotative movement of that nut, the screw may be turned in the usual way to move the slide in either direction without any slackness in the turning action. The correct adjustment of the slide and its retention in the adjusted position is thus made possible, and the accurate and uniform operation of the tool carried by the slide in relation to its work, ensured.

In the form of the invention shown in the drawing the slide A is formed with an opening J in its top positioned above the location of the nut H through which access may be had to the nut for the purpose of turning it. The nut shown is of circular form and is made with radial holes at intervals around its periphery to receive the end of a rod which may be passed down through the opening J for use as a lever in turning the nut. The opening J is normally closed by a cover plate M countersunk into the surface of the slide and secured by suitable set screws to make a uniform surface with the surface of the slide. This cover plate is removed in Fig. 1.

For holding the nut from rotation, the nut may be formed with a series of transverse closely placed deep serrations N (Figs. 4 and 5) in its peripheral surface, and a toothed lug O is provided to engage with any one of these serrations, such lug being secured by set screw P passing through a slot in the upper part of the lug to a depressed part of the slide upon the front edge of the opening J and underneath the plate M, so that its tooth projects downward through the opening to engage a serration in the nut's surface. The loosening of the set screw will allow of the nut being turned beneath the said tooth. Other ways of thus locking this nut to the slide may be readily devised and employed.

The engaging faces of the back nut H and the nut block G may be made respectively of spigot and socket nature, as shown in Fig. 4, for the purpose of ensuring of their more effective cooperation in the assembly of the parts comprising the invention.

I claim:

An apparatus for compensating backlash between a feed screw and block nut in a tool slide of a machine tool comprising a back nut fitted upon the feed screw alongside the block nut and adapted by rotation upon the screw, to be moved along the screw into abutting relation to the said block nut, and means operable for locking said back nut to the slide in said relation to prevent any rotative movement of the nut upon the screw, and operable to free said nut to permit such movement, such means including longitudinal serrations on the back nut and a spring tooth affixed to the slide engaging said serrations.

TERENCE WORDSWORTH FEENEY.